R. J. ESPINOZA.
CULTIVATOR.
APPLICATION FILED DEC. 24, 1919.
1,353,574.
Patented Sept. 21, 1920.
2 SHEETS—SHEET 1.
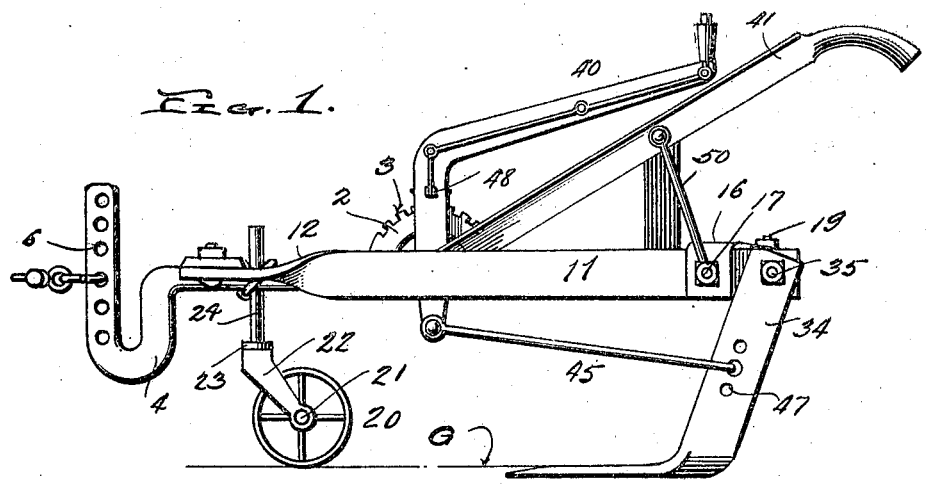
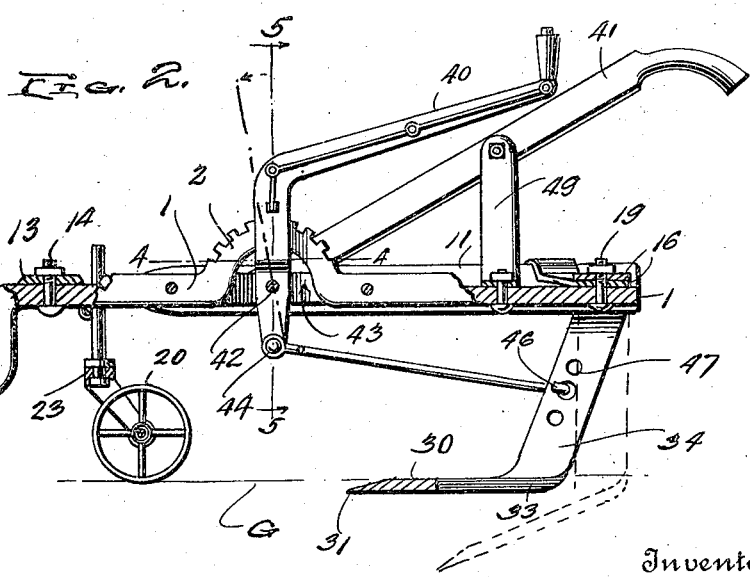
Inventor
Romolo J. Espinoza

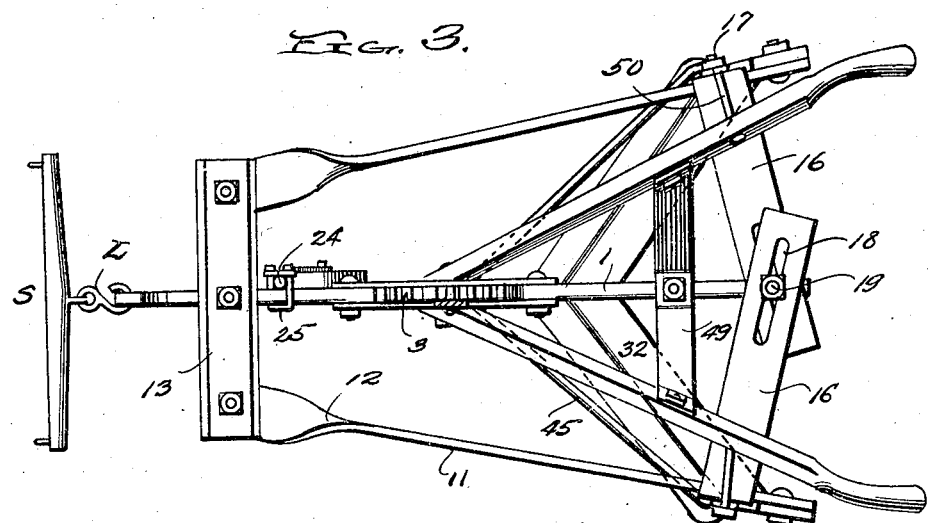
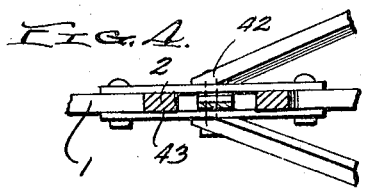
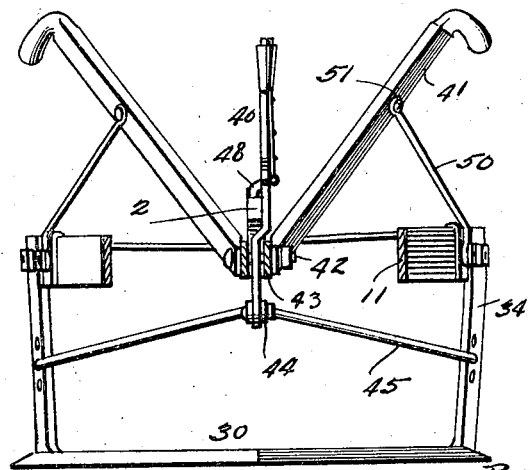

UNITED STATES PATENT OFFICE.

ROMOLO J. ESPINOZA, OF ROSA, NEW MEXICO.

CULTIVATOR.

1,353,574.  Specification of Letters Patent.  Patented Sept. 21, 1920.

Application filed December 24, 1919. Serial No. 347,164.

*To all whom it may concern:*

Be it known that I, ROMOLO J. ESPINOZA, a citizen of the United States, residing at Rosa, in the county of Rio Arriba, State of New Mexico, have invented certain new and useful Improvements in Cultivators; and I do hereby declare the following to be a full, clear, and exact description of the invention, such as will enable others skilled in the art to which it appertains to make and use the same.

This invention relates to cultivators, and more especially those having scooter blades or shovels.

One purpose of the present invention is to produce a cultivator which is primarily intended for dry farming, although it is quite possible to use it for other purposes, the machine having means for setting the blade higher or lower, which setting or adjusting means is not connected with the blade itself and lies wholly above the surface of the earth.

Another purpose of the invention is to provide operating mechanism for said adjusting means which is extremely simple and is effective.

Another purpose is to provide a frame structure adapted to be varied in width so as to accommodate different blades, the latter adapted to the varying distances between rows of plants in different crops.

The following specification sets forth the preferred manner of carrying out the invention, reference being had to the drawings wherein:

Figure 1 is a side elevation.

Fig. 2 is a longitudinal section.

Fig. 3 is a plan view.

Fig. 4 is a sectional detail on the line 4—4 of Fig. 2.

Fig. 5 is a transverse sectional view on line 5—5 of Fig. 2 looking toward the rear of the machine.

What might be called the main beam of the frame is a bar 1, preferably of metal, which at about its midlength is arched upwardly at 2 and toothed on its upper edge as at 3, and which at its front end is here shown as dropped as at 4, thence turned upward as at 5 and provided with perforations 6 or other details of construction for attaching the draft at various heights, said draft being herein illustrated as a swingletree S connected by a link L with one of the perforations. Said main beam or bar constitutes the central element of the main frame. It is complemented on opposite sides by side beams or bars 11, preferably made of strap iron and standing on edge throughout most of their length, given a quarter twist 12 near their front ends, and the latter underlying a cross bar 13 to which said front ends are bolted as at 14, the midlength of this bar being bolted as at 15 to the main beam 1. Links 16 are bolted at their outer ends at 17 to the rear ends of the side beams, and their inner ends are lapped over each other and slotted as at 18 so as to adjustably receive a bolt 19 passing through the main beam near its rear end. As seen in Fig. 3, the main frame is usually wider at its rear end than at its front end, but it will be obvious that by loosening the bolt 19 and adjusting the slotted links, the side beams may be drawn inward or pushed outward to reduce or expand said frame in width as desired.

Usually the forward portion of the frame is supported by a caster wheel 20 which travels on the ground surface G, the wheel being pivoted at 21 in a fork 22 here shown as having its shank swiveled at 23 on the lower end of a standard 24 which rises alongside the beam 1 and is adjustably connected therewith by any suitable means such as the clip 25. Thus the front end of the entire frame can be caused to travel at any desired distance above the ground level indicated at G, and the swinging of the caster wheel permits steering as the draft is directed to either side.

The cultivator shovel is specifically formed as a V-shaped blade 30 with its angle disposed toward the front beneath the main beam and its front edge 31 sharpened. The arms 32 of this blade incline rearward and outward, are bent upward sharply at 33, and rise thence in what might be called standards 34 whose upper ends pass outside the rear ends of the side beams 11 and are pivoted thereto by bolts 35 rearward of the bolts 17 which connect the links with the beams. By reason of such pivotal supports, the entire shovel can be adjusted as seen in dotted lines in Fig. 2.

The operating mechanism whereby such adjustment is effected comprises a hand lever 40 standing between the main handles 41 and with its forward portion deflected and pivoted on a bolt 42 which passes through two plates or strips 43 and which outside of them may serve to support said main handles, the lower end of the lever being pivoted at 44 to a pair of rods 45 which diverge rearward from the pivot and are hooked at 46 at their rear ends so as to be engaged selectively with holes 47 in the standards 34. The hand lever has a thumb latch 48 engaging the teeth 3 of the arch 2 so as to hold it adjusted, and the main handles may be supported by braces 49 rising to them from the rear portion of the main beam 1.

When now it is desired to adjust the height of the blade 30, the hand lever 40 is swung on its pivot 42, and the rods 45 are thereby pushed rearward or drawn forward, their hooks 46 swinging the standards 34 accordingly and therefore depressing or raising the blade itself; and yet all parts of this adjusting mechanism and the means for operating it stand well above the ground level so that nothing engages the soil but the blade, its arms 32, its bends 33, and the lower portions of its standards 34. The purpose of the wheel 20 is obviously to support the front end of the machine so that, after the adjusted blade has caused the rise or fall of the rear end of the machine as it will in the progress of the latter, the blade eventually assumes a horizontal position and scoots along through the soil at the desired distance below the ground level. For cultivating crops where the rows are at various distances apart, the machine will be supplied with several shovels whose arms are of different lengths so that their standards are variously spaced. It is obvious that by removing the bolts 35 and disengaging the hooks 46 from the holes 47, the shovel can be detached and replaced by one which is wider or narrower and no special tools are needed. This will require that the side beams of the main frame be adjusted inward or outward to correspond and the slots 18 and bolt 19 permit. The main handles 41 may be additionally braced by links 50 leading from the bolts 51 at the upper end of the braces down to the bolts 17 at the outer ends of the links 16, but these additional braces are not always necessary and would obviously have to be discarded when the frame is set to a width other than standard, unless the braces themselves were adjusted at one end or the other. Attention is invited to the fact that the toothed sector for the hand lever is formed as an integral part of the main beam 1 by arching it upward as at 2, and the pivot for this lever is through a pair of plates or strips 43 which span the arch.

As suggested above, this cultivator is usually provided with a scooter blade which is especially serviceable in dry farming. After a rain has ceased and while the pores in the earth are still open, the machine is carried or hauled to the point of use and the blade adjusted properly, and when draft is applied at S in Fig. 2 the sharp edge 31 of the blade 30 is drawn through the soil just below the ground level G so as to turn over the earth at and immediately below the surface and close the pores to prevent evaporation of the moisture. It is conceivable that this might occur at a time when the ground had already been seeded, in which case the blade would have to be very carefully set so that it would not enter the soil far enough to interfere with the seeds or with sprouts which had just started from them. Under other conditions and at other times the blade may be set to travel through the ground on a line farther below the surface indicated at G. But whatever the adjustment, no part of the adjusting means will touch the ground.

What is claimed as new is:

1. In a cultivator, the combination with a frame having a supporting wheel at its front end, and a hand lever pivoted across one bar of the frame; of a scooter blade including divergent arms and standards rising from their outer ends and pivoted to the rear end of the frame, said arms having several holes within their length, and adjusting rods connected at their front ends with the lower end of said lever and having their rear ends diverging from each other and hooked for selective engagement with the holes of said standards, the rods standing wholly above the earth's surface.

2. In a cultivator, the combination with a frame comprising a pair of side beams and a central main beam having an arch near its midlength; of a cultivator blade including divergent arms and standards rising from their outer ends and pivoted to the rear ends of the side beams, a hand lever whose lower end is connected with said standards, plates spanning said arch and secured to its opposite sides, a pivot through said plates and the interposed lever, fastening means on the lever engaging the arch, and the handles attached to the ends of said bolt and supported from said side beams, as described.

3. In an agricultural machine having an earth-engaging tool pivotally supported beneath its frame, the combination with a longitudinal frame bar having an upstanding arch toothed on its outer periphery, and plates secured across opposite sides of said arch; of a bolt connecting the plates and extending across within the arch at its center, a lever pivoted on the bolt between said plates and having one arm movable alongside the arch, a thumb latch on the lever engaging said teeth, and means for adjusting said tool on its pivot by setting said lever.

In testimony whereof, I affix my signature, in the presence of two witnesses.

ROMOLO J. ESPINOZA.

Witnesses:
 ISAAC QUINTANA,
 JOSE CANDELARIA.